Figure 1:
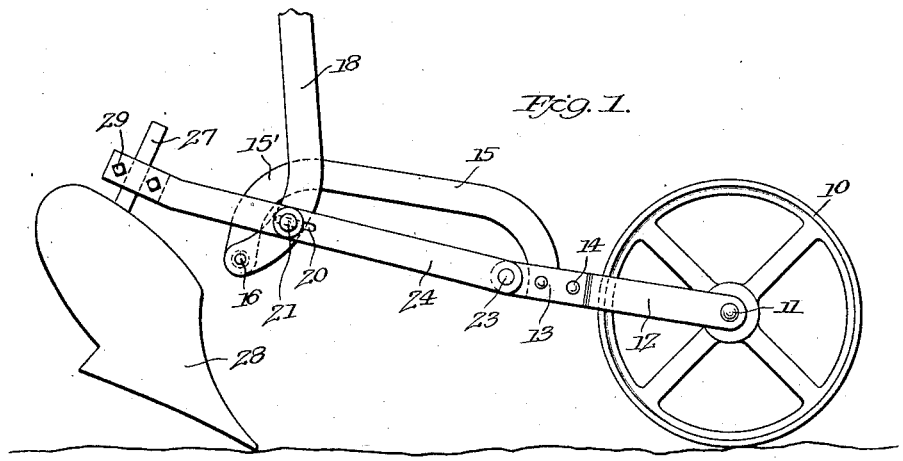

March 13, 1928. 1,662,674

F. HURKA

GARDEN IMPLEMENT

Filed June 24, 1924

Inventor

Frank Hurka

Patented Mar. 13, 1928.

1,662,674

UNITED STATES PATENT OFFICE.

FRANK HURKA, OF BALLSTON SPA, NEW YORK.

GARDEN IMPLEMENT.

Application filed June 24, 1924. Serial No. 722,087.

The present invention relates to cultivating devices, and more particularly to a hand implement intended for use in a small garden where it is not convenient or necessary to employ a power driven implement. Heretofore, so far as I am aware, it has been customary under such circumstances to loosen and turn up the soil by means of a hand spade or similar tool, which is very laborious and tiring work, since it requires constant stooping and lifting on the part of the tiller.

The invention seeks to provide a hand tool which may be operated with a minimum of effort, and which will function in much the same manner as the usual horse or tractor drawn device. This invention is an improvement upon the implement disclosed in my co-pending application Serial No. 567,368, filed June 10, 1922.

A further object of the invention is to provide an implement which is of simple construction, which may be economically made and sold at a comparatively low price, and which may be either pushed or drawn, as the operator may desire.

The invention further aims to provide a construction in which the tool portion proper, such as a plow or series of cultivator teeth may be removably and adjustably positioned thereon, permitting variation in the depth of the soil turned up, and also enabling the operator to substitute one tool or ground penetrating element for another.

Another object of the invention is to afford a construction in which the tool portion, such as the plow proper, may, by movement of a suitable draft arm, be forced into the ground with but little effort on the part of the operator. The invention further seeks to insure even penetration of the ground by the tool as the implement is moved along and has as an object the provision of suitable connections between the draft arm and the tool whereby the pull of the operator in working the implement at the same time maintains the tool proper in the ground.

Additional objects of the invention, such as rigidity and durability of construction, effective operation and other objects of a more minute character which are more closely connected with the details of the embodiment disclosed in the accompanying drawings will become obvious as the description proceeds.

The invention consists, broadly, of an implement comprising a ground engaging member, such as a wheel having pivotally connected thereto a link to which is pivotally connected a tool carrying beam. Upon the latter is mounted, preferably adjustably and removably, some suitable ground penetrating member, such as a plow or series of cultivator teeth. A draft arm is pivotally connected to the link to operate the same and has a portion engaging the beam so that movement of the arm will effect pivotal movement of the beam to cause the tool to penetrate the ground.

The above general description of the device indicates the broader characteristics of the invention, although it will be understood that some of the features mentioned above may be modified without departing from the scope of the invention, which is defined by the prior art and more definitely set forth in the claims following this description.

Referring to the drawings, wherein there is shown for purposes of disclosure one specific embodiment of the invention, Fig. 1 is a side elevational view of the device prior to operation.

Figure 2:
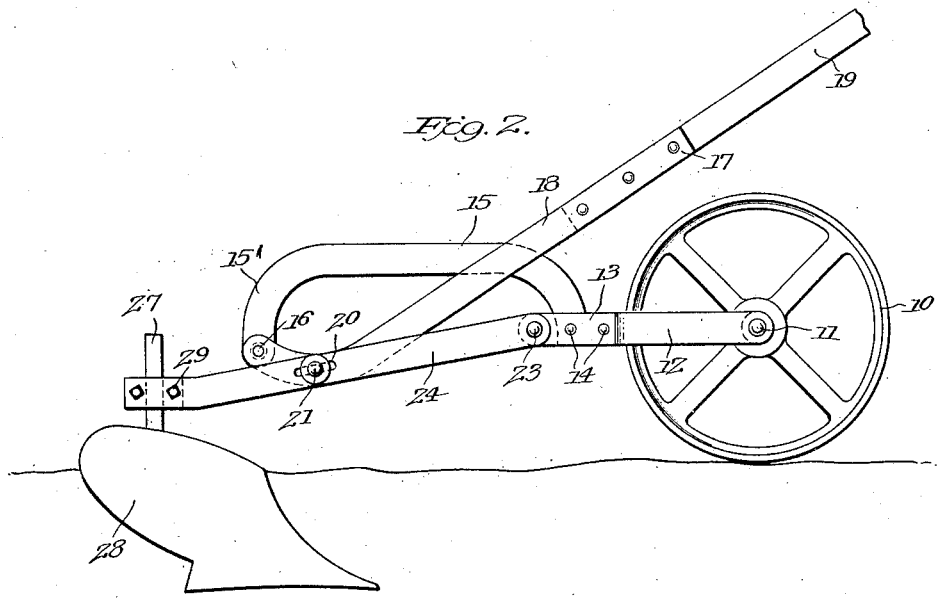
Figure 3:
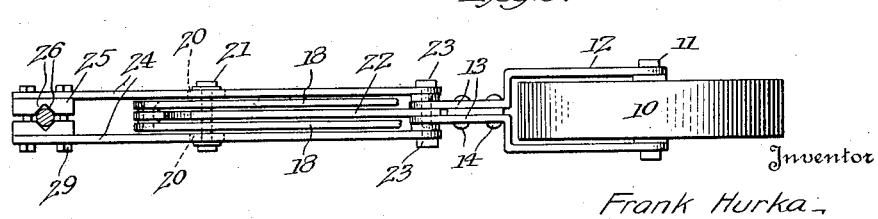

Fig. 2 is a side elevational view showing the draft arm moved to position for operation of the implement with the tool penetrating the ground, and Fig. 3 is a bottom plan view.

In the drawings 10 indicates a ground engaging supporting member which, in the present instance, is in the form of a wheel or roller mounted upon an axle 11, having bearings in a yoke 12. The yoke is preferably formed by two strips of metal provided with parallel juxta-posed ends 13, between which is positioned and secured by means of rivets 14, the end of a substantially U-shape bracket 15 extending upwardly and rearwardly and having a depending portion 15′, which carries a pivot pin 16 for the end of a draft arm 17. The yoke 12 may be considered as constituting a link in the device. While the bracket 15 is shown as a separate element, it will be understood that the same may be integral with the yoke 12 if desired.

The draft arm 17 is formed by means of a pair of extension strips 18, which are pivotally mounted at opposite sides of the bracket 15 on pivot pin 16, and at their opposite ends are connected to a suitable handle portion 19. By means of the draft arm 17 the implement may be either pushed or pulled, and in Fig. 2, it is shown swung to operative position about its pivot 16. It will be noted that the pivoted end of the arm is curved upwardly and adjacent this end the same is formed with slots 20, through which project a stud 21, to which is pivotally connected a link 22 connected at its opposite end to a stud 23 positioned in the portion 13 of the yoke 12. The studs 21 and 23 also pass through a tool beam 24 formed, preferably, from a pair of metallic strips, which are pivotally connected to the yoke 12 by means of the stud 23. The stud 21 serves to connect the beam to the draft arm 17. At its free end the beam carries a pair of blocks 25 provided with registering sockets 26 adapted to receive the shank 27 of a suitable ground penetrating tool 28, such as a plow. Any suitable gripping means, such as clamping bolts 29 which pass through the beam, may be employed to engage the tool shank. It will be observed that the tool may be adjusted vertically in the socket 26 to vary the depth of the furrow, and may also be removed when a tool of different type is to be employed.

The tool beam 24 is positioned beneath the draft arm 17, so that movement of the latter downwardly about its pivot 16 may transmit pressure to the beam and thereby force the tool 28 into the ground. Any suitable connection may be employed, but the preferred connection is illustrated in the drawings and includes the stud 21 extending through the draft arm and the tool beam, the latter being provided with slots 20, which permit free movement of the beam about its pivot stud 23 as the draft arm is moved either upwardly or downwardly. The link 22 is not provided with elongated slots, but is held against longitudinal movement relative to the studs 21 and 23, as will be apparent from an inspection of Figure 3. Consequently, either a pushing or pulling strain applied to the draft arm 17 will be transmitted to the device and supporting wheel 10 through the bracket 15 and link 22 independently of the tool beam 24.

In operation of the implement the several parts are initially in their relative position shown in Fig. 1, with the point of the tool resting upon the ground and the draft arm extending upwardly. When the operator exerts a forward and downward pressure upon the draft arm, there results a pivotal movement of the arm about the pin 16, the beam 24 is moved about its pivot stud 23, forcing the tool into the ground. As the operator draws the implement along the ground forwardly or toward the right as viewed in Figure 1, the penetration of the tool continues until the beam 24 is moved to substantially the position shown in Figure 2. The draft arm is then inclined in substantially the angle shown in the same figure, and the implement may be readily drawn along with the parts in this position by comparatively little exertion on the part of the operator.

It will be observed that the draft arm is connected to the tool beam close to the fulcrum of the arm so that the same serves as a lever in forcing the tool beam about its pivot. Since the draft arm extends a substantial distance above its point of connection with the tool beam, it will force the tool into the ground very readily and the depth of the cut may be varied by adjusting the tool vertically which is accomplished by loosening the clamping bolts 29.

Due to the arrangement of parts the arm 17 may be employed to push the implement when this is desirable. Under such circumstances, if a tool of the type shown in the drawings is to be employed this need simply be turned or if other tools are to be used they may be readily substituted. Obviously, either a pulling or pushing effort on the part of the operator applied at the end of the handle 19 will force the beam 24 downwardly and thereby maintain the tool in the ground. Either a pushing or pulling action will be transmitted through the bracket 15, link 22, and yoke 12 to the wheel 10, independently of the tool beam.

It should be understood that numerous modifications may be made in the structure illustrated and described without departing from the scope of the invention which is defined in the following claims.

This application is a continuation in part of my co-pending application, Serial No. 567,368, filed June 10, 1922.

I claim:—

1. A hand garden implement tool of the class described comprising a rotatable ground engaging member, a shaft carrying said member, a tool beam, a ground penetrating tool mounted on said beam, a link pivotally connected at one end to said beam and at its other end connected to said shaft, a draft arm having a fulcrum on said link between said ground tool and said shaft, said arm being operatively connected to said beam whereby pivotal movement of said arm about its axis in one direction will effect pivotal movement of said beam about its own axis to cause said tool upon forward movement of the implement to penetrate the ground.

2. A hand garden implement of the class described comprising a rotatable ground engaging member, a shaft carrying said member, a tool beam, a ground penetrating tool mounted on said beam, a link pivotally connected at one end to said beam and at its other end connected to said shaft, a pull or draft arm having a fulcrum on said link, said arm being operatively connected to said beam whereby pivotal movement of said arm about its axis in one direction will effect pivotal movement of said beam about its own axis to cause said tool upon forward movement of the implement to penetrate the ground.

3. In a device of the class described, a ground engaging and supporting member, a link connected to said member, a beam pivotally connected to said link, a ground penetrating tool carried by said beam, a pull draft arm having a fulcrum on said link and adapted to apply pressure to said beam to move the latter about its pivot and thereby to force said tool upon forward movement of the device into the ground, said arm when moved about its fulcrum to apply pressure to the tool projecting in the opposite direction from said tool.

4. In a device of the class described, a ground engaging and supporting member, a link connected to said member, a tool beam pivotally connected to said link, a ground penetrating tool carried by said beam adjacent one end thereof, a draft arm having a fulcrum on said link between the tool and said supporting member, said arm having a free manually engageable end and operatively associated adjacent its other end with said beam, whereby when moved about its fulcrum the arm serves to actuate said beam and to force said tool into the ground, said arm, when moved about its fulcrum to apply pressure to the tool, projecting away from said tool.

5. In a device of the class described, a ground engaging and supporting member, a link connected to said member, a tool beam pivotally connected to said link, a ground penetrating tool carried by said beam adjacent one end thereof, a draft arm having a fulcrum on said link between the tool and said supporting member, said arm having a free manually engageable end and operatively associated adjacent its other end with said beam, whereby when moved about its fulcrum the arm serves to actuate said beam and to force said tool into the ground upon forward movement of the device, said arm when moved to force the tool into the ground projecting in the same direction in which the tool is to be drawn whereby to serve as a pull means for the device.

6. In a device of the class described, a rotatable ground engaging and supporting member, an axle for said member, a link connected to said axle, a tool beam pivotally connected to the link and carrying a ground penetrating tool, a draft arm having a fulcrum on said link, said arm being operatively associated with the beam, whereby, when moved about said fulcrum, the arm actuates the beam to force the tool toward the ground, the arm being movable about its fulcrum away from said tool to actuate said beam and force the tool toward the ground.

7. In a device of the class described, a rotatable ground engaging and supporting member, an axle for said member, a link connected to said axle, a tool beam pivotally connected to the link and having a ground penetrating tool thereon, a draft arm having a fulcrum on the link between said tool and the axle and having a portion at one end for manual engagement and a second portion adjacent its other end operatively engaging said beam to force the tool into the ground upon forward movement of the device, said arm being movable about its fulcrum away from said tool to apply pressure to the beam and force the tool into the ground.

8. In a device of the class described, a rotatable ground engaging and supporting member, an axle for said member, a link connected to said axle, a tool beam pivotally connected to said link and having a ground penetrating tool thereon, a draft arm having a fulcrum on the link and having a portion engaging said beam, whereby to move the latter about its pivot and force the tool toward the ground when the arm is pivotally moved, said arm when pivotally moved to actuate the tool beam projecting away from the tool.

9. In a device of the class described, a rotatable ground engaging and supporting member, an axle for said member, a link connected to said axle, a tool beam pivotally connected to said link and having a ground penetrating tool thereon, a draft arm having a fulcrum on the link and having a portion engaging said beam, whereby to move the latter about its pivot and force the tool toward the ground when the arm is pivotally moved, said arm when pivotally moved to actuate the tool beam projecting away from the tool, and in the direction the device is operative whereby to serve as a pull means.

10. In a device of the class described, a rotatable ground engaging and supporting member, an axle for said member, a link carried by the axle, a tool carrying beam pivotally connected to said link, the link having a portion extending beside said beam, a ground penetrating tool on the beam, a draft arm having a fulcrum on said portion of the link between said member and the tool and, when moved about its pivot, projecting over said member away from the tool and serving to apply pressure to said beam, whereby to force the tool into the ground upon forward movement of the device.

11. A device of the class described, comprising a rotatable ground engaging and supporting member, an axle for said member, a link connected to the axle, a tool carrying beam pivotally connected to said link, a ground penetrating tool on the beam, a draft arm having a fulcrum on the link spaced from the connection between said link and beam and operatively associated with said beam, whereby to move the latter and force said tool toward the ground when the arm is moved about its fulcrum.

12. A device of the class described, comprising a rotatable ground engaging and supporting member, an axle for said member, a link connected to the axle, a tool carrying beam pivotally connected to said link, a ground penetrating tool on the beam, a draft arm having a fulcrum on the link spaced from the connection between said link and beam and operatively associated with said beam, whereby to move the latter and force said tool into the ground when the arm is moved about its fulcrum and the device is forwardly moved, said arm when moved to force the tool into the ground projecting away from the tool and having its free end arranged adjacent said ground engaging and supporting member, whereby to serve as a pull means for the device.

13. A hand garden tool of the class described comprising a rotatable ground engaging member, a shaft carrying said member, a beam, a ground penetrating tool mounted on said beam, a link pivotally connected at one end to said beam and at its other end connected to said ground engaging member, an arm pivotally connected to said link, said arm being operatively connected to said beam whereby pivotal movement of said arm about its axis in one direction will effect pivotal movement of said beam about its own axis to cause said tool to penetrate the ground upon forward movement of the device.

14. A hand garden tool of the class described comprising a rotatable ground engaging member, a shaft carrying said member, a beam, a ground penetrating tool mounted on said beam, a link pivotally connected at one end to said beam and at its other end connected to said ground engaging member, a pull draft arm pivotally connected to said link, said arm being operatively connected to said beam whereby pivotal movement of said arm about its axis in one direction will effect pivotal movement of said beam about its own axis to cause said tool to penetrate the ground upon forward movement of the device.

15. A hand garden tool comprising a rotatable ground engaging member having an axial shaft, a link pivotally connected to said ground engaging member at said shaft, a tool carrying beam pivotally connected to said link at a point spaced from said ground engaging member, a ground penetrating tool on said beam, and a "pull" draft arm operatively connected with said beam to effect movement of the same about its pivot, and extending forwardly over said ground engaging member.

16. A hand garden tool comprising a rotatable ground engaging member having an axial shaft, a link pivotally connected to said ground engaging member at said shaft, a tool carrying beam pivotally connected to said link at a point spaced from said ground engaging member, a ground penetrating tool on said beam, and a "pull" draft arm operatively connected with said beam to effect movement of the same about its pivot, and extending forwardly over said ground engaging member, said draft arm being adjustable relative to said ground penetrating tool.

17. A hand garden tool comprising a rotatable ground engaging member having an axial shaft, a link pivotally connected to said ground engaging member at said shaft, a tool carrying beam pivotally connected to said link at a point spaced from said ground engaging member, a ground penetrating tool on said beam directed toward said ground engaging member, and a pull draft arm operatively connected with said beam to effect movement of the same about is pivot and extending forwardly over said ground engaging member.

18. In a device of the class described, a pair of links pivotally connected, a rotatable ground engaging member mounted on one of said links, a beam pivotally secured to one of said links, a draft arm pivotally connected to said links, said beam and said arm being operatively connected whereby pivotal movement of the arm in one direction will cause pivotal movement of said beam, and a ground penetrating tool mounted on said beam and adapted to be forced toward the ground when said beam is moved in one direction by said arm.

In testimony whereof I have hereunto set my hand.

FRANK HURKA.